April 22, 1924.
C. I. HALL
1,491,396
STARTING AND PROTECTIVE SWITCH
Filed May 2, 1921
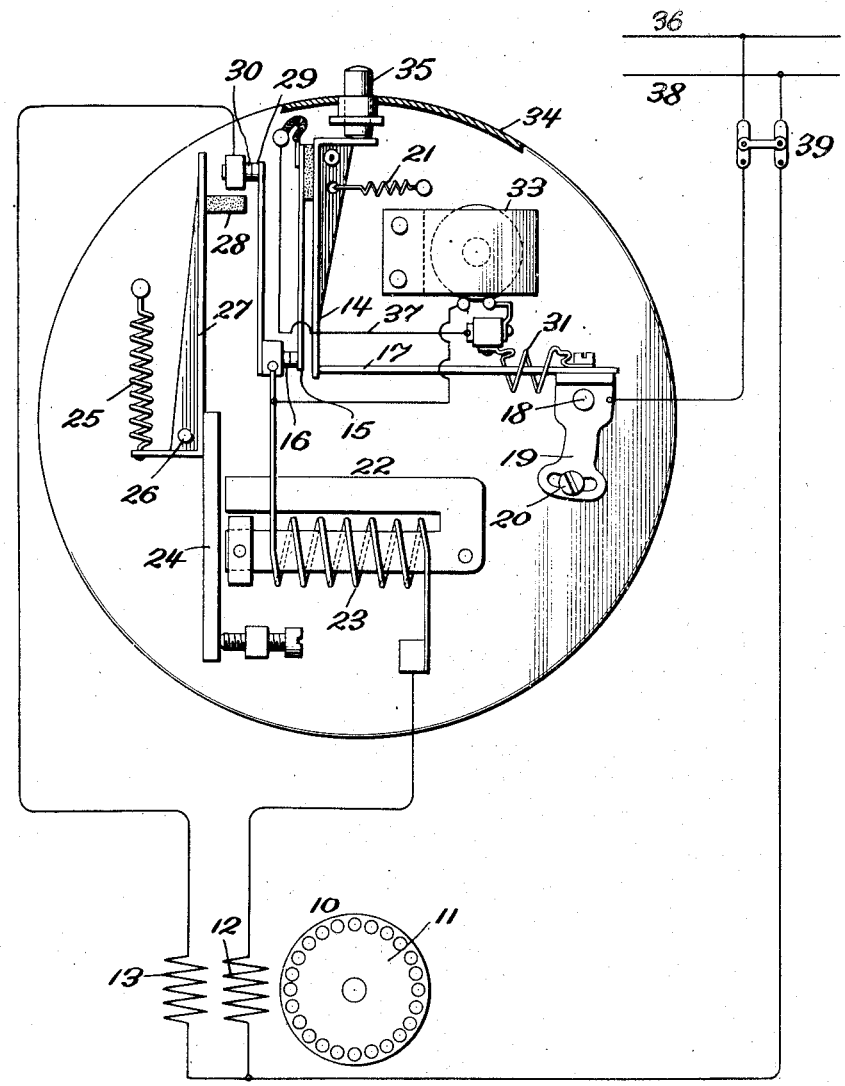
Inventor:
Chester I. Hall
by *Albert G. Davis*
His Attorney Patented Apr. 22, 1924.

1,491,396

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

STARTING AND PROTECTIVE SWITCH.

Application filed May 2, 1921. Serial No. 466,334.

*To all whom it may concern:*

Be it known that I, CHESTER I. HALL, a citizen of the United States, residing at Fort Wayne, in the county of Allen, State of Indiana, have invented certain new and useful Improvements in Starting and Protective Switches, of which the following is a specification.

My invention relates to improvements in electric switches and in particular to thermal time switches.

Although not necessarily limited thereto, the invention is particularly useful in the control of electric motors having different connections for starting and for running. One of the objects of the invention is to provide a switch which will give a thermal time element protection of the motor both during starting and during running and which will automatically open the starting connections of the motor at the proper interval.

The invention embodies as one of its elements the thermal time switch which I have described and claimed in my copending application, Serial No. 466,335, filed May 2, 1921, which is assigned to the same assignee as this application. A form of the thermal time switch of said application is used to control the starting and running connection of a motor, and a normally open switch cooperates with the said thermal switch to automatically open the motor starting connections when the motor has accelerated to the proper speed. The normally open switch is controlled responsively to the speed of the motor by an electromagnet in the running connections controlled by the said thermal switch. The thermal switch is caused to open automatically under any condition responsive to a predetermined rise of temperature of the motor.

The various features of construction and arrangement of the invention are fully described hereinafter and the scope of the invention is indicated by the appended claims.

For a better understanding of the invention, reference is had to the accompanying drawing which illustrates one embodiment of my invention for the purpose of explaining the principles thereof.

Referring to the drawings, the electric motor 10 of the alternating current single-phase type, having a squirrel cage rotor 11, a running winding 12 and a starting winding 13, is adapted to be controlled by my improved electric switch. This switch mechanism comprises a pivoted switch member 14 which has connected therewith, but insulated therefrom, a resiliently mounted switch contact 15 which is adapted to engage the stationary switch contact 16 so as to control the starting and running connections of the motor. This switch member 14 is adapted to be controlled by means of the thermostatic latch 17 which is pivotally mounted at its right hand end on the pin 18, and is adjustable about the pin 18 by means of the extension 19 having a slot in its end which cooperates with the screw 20. By means of this adjustable connection, the thermostatic latch 17 may be adjusted with respect to the switch member 14 so as to bend or flex in a certain time interval so as to be freed from the end of the switch member 14 and thereby permit this switch member to return to its biased or open position by the action of the spring 21.

An electro-magnet 22 having its winding 23 connected in series with the running winding 12 of the motor is energized through the switch contacts 15 and 16. This electro-magnet has a pivoted armature member 24 which is biased to the unattracted position by means of the spring 25, and the armature has connected therewith on the upper side of the pivot point 26 an extension 27 which carries an insulated stop 28. The resiliently mounted switch contact 29 is adapted to cooperate with the stationary contact 30 to energize the starting winding 13 of the motor. The contacts 29 and 30 are biased to the closed position by reason of the biasing effect of the resilient mounting for the contact 29 and these contacts are operated to and held in the open position by the stop 28 due to the action of the spring 25 exerting a predominating bias to the open position when the winding 23 of the electro-magnet 22 is deenergized or when the current through the winding 23 has dropped to a predetermined value due to the speeding up of the motor. The limit of movement of the arature 24 with respect to the electro-magnet 22 may be adjusted as shown so that the contacts 29 and 30 may be opened at approximately any desired speed of the motor.

A heating coil 31 is disposed with respect to the thermostatic latch 17 so as to heat the same in accordance with the current through the switch contacts 15 and 16, that is, in accordance with the current taken by the motor. The bell or buzzer, or any other suitable indicating device, 33, has its terminals connected in shunt to the switch contacts 15 and 16, so that when the contacts are closed the indicating device is deenergized and when the contacts are opened, it is energized to indicate the fact that the switch has opened. The various parts of the switch are mounted within a casing 34 which provides a thermal storage space determined by the volume of the casing so that the same length of time will always be required for the same deflection of the thermostatic latch and the deflection of the latch will thus correspond rather closely to the heating of the motor. Thus, a dead air space is obtained within the casing which is maintained at a temperature which is substantially independent of room or ambient temperature, so that the device is operated substantially directly in accordance with the heating effect of the coil 31 and thus in accordance with the heating of the controlled device. A button 35 of insulating material extends through the casing 34 and cooperates with the switch member 14 so as to return the switch contacts 15 and 16 to the closed position after they have been automatically opened by the operation of the thermostatic latch 17.

As thus constructed and arranged and with the parts in the various positions shown in the drawings, the operation of my invention is as follows:—Let it be assumed that the thermostatic latch 17 has been adjusted to the proper position and that the extension 19 has been adjusted to the proper position and held there by the screw 20. The starting and running connections of the motor will be simultaneously energized, the circuit for the running winding 12 being from the supply conductor 36, through the heating coil 31, the conductor 37, the switch contacts 15 and 16 and the winding 23 on the electromagnet 22 to the other supply conductor 38. The starting winding 13 of the motor will be energized in shunt to the running winding 12 through the switch contacts 29 and 30. When the current taken by the motor at starting has dropped to the predetermined value due to the speeding up of the motor, the armature 24 of the electromagnet is released and the insulating stop 28 automatically opens the switch contacts 29 and 30 by reason of the action of the spring 25. The instantaneous value of the current in the running winding 12 of the motor at starting is proportional to the speed of the motor for a given load, so that the electromagnet 22 is thus energized responsively to the speed of the motor. The starting winding of the motor is thereby deenergized and the running winding 12 remains energized.

If the current taken by the motor either at starting or during the normal operation of the machine is in excess of a predetermined value for a certain time interval such as would cause overheating of the motor, the thermostatic latch 17 will bend free from the end of the switch member 14 and permit the switch member to automatically open the circuit to the motor. The opening of the contacts 15 and 16 will open the running winding of the motor and thus deenergize the electromagnet 22, so that the armature 24 is released to move clockwise in accordance with the bias of the spring 25 to bring the stop 28 into engagement with the resilient support for the contact 29 and thus open the starting contacts 29 and 30. The signaling device 33 is energized by the opening of the contacts 15 and 16 to indicate the fact that the switch has opened. The contacts 15 and 16 will remain open due to the action of the spring 21 and the contacts 29 and 30 will be held open due to the action of the spring 25 until the controller is manually reset.

When the switch has opened due to the flexing of the thermostatic latch, it may be reclosed by means of the button 35, thereby closing the normally open switch contacts 15 and 16, energizing the electromagnet 22 and attracting the armature 24 so as to permit the normally closed contacts 29 and 30 for the starting winding to close.

The motor may be deenergized at any time desired by the operation of the disconnecting switch 39.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. The combination with an electric motor having different connections for starting and for running, of a switch biased to the open position for controlling both connections, and thermal responsive means for holding the said switch in the closed position and for releasing the switch to open in accordance with its bias responsively to a predetermined rise in temperature of the motor.

2. The combination with an electric motor having different connections for starting and for running, of a switch biased to the open position for controlling both connections, electromagnetically controlled means energized responsively to the speed of the motor for opening the starting connections of the motor, and thermal responsive means for holding the said switch in the closed position and for releasing the switch to open in accordance with its bias responsively to a predetermined rise in temperature of the motor.

3. The combination in an electric switch of a switch member biased to the open position, thermal responsive means for holding the said switch member in the closed position, a second switch member cooperating with the first switch member, and an electromagnet controlled by the first switch member for controlling the second switch member.

4. The combination in an electric switch of a switch member biased to the open position, a second switch member cooperating with the first switch member to control a translating device, thermal-responsive means heated in accordance with the current taken by the translating device for holding the first switch member in the closed position, and an electromagnet controlled by the first switch member for closing the second switch member and automatically thereafter opening the same after an interval.

5. The combination in an electric switch of a switch member biased to the open position, a flexible thermostatic latch for holding the switch member in the closed position, the said latch adapted to be flexed responsively to the current through the switch to thereby release the switch member, a second switch member, and an electromagnet controlled by the first switch member for controlling the second switch member.

6. The combination in an electric switch adapted to control a motor having different connections for starting and running, of a switch adapted when closed to establish the running connections of the motor, a second switch for controlling the starting connections of the motor and biased to the open and the closed positions respectively with the opening bias predominating and means controlled by the motor for automatically opposing the opening bias of the said second switch to permit the same to close during the acceleration of the motor.

7. The combination in an electric switch adapted to control an alternating current motor having different connections for starting and running, of a normally open switch adapted when closed to establish the running connections of the motor, a second switch cooperating with the said normally open switch to establish the starting connections of the motor and biased to the open and the closed positions respectively with the opening bias predominating and an electromagnet energized responsively to the current taken by the motor at starting for automatically opposing the opening bias of the said second switch to permit the same to close and thereby establish the starting connections of the motor.

8. The combination in an electric switch adapted to control an alternating current motor having a starting winding and a running winding, of a switch member biased to the open position and adapted when closed to energize the running winding, thermal-responsive means for holding the said switch member in the closed position, a second switch member adapted when closed to energize the starting winding when the first switch member is closed, and means controlled by the motor for automatically opening the second switch member.

9. The combination in an electric switch adapted to control an alternating current motor having a starting winding and a running winding, of a switch member biased to the open position and adapted when closed to energize the said running winding, thermal-responsive means for holding the said switch member in the closed position, a second switch member adapted when closed to energize the starting winding when the first switch member is closed, and means controlled by the current in the running winding for opening the second switch member.

10. The combination in an electric switch adapted to control an alternating current motor having a starting winding and a running winding, of a switch member biased to the open position and adapted when closed to energize the said windings, thermal-responsive means for holding the said switch member in the closed position, a second switch member for controlling the starting winding, and electromagnetically controlled means energized responsively to the current in the running winding for automatically closing and opening the second switch member and thereby energizing and subsequently deenergizing the starting winding.

11. The combination in an electric switch adapted to establish starting and running connections for a motor, of a switch member for controlling the motor starting and running connections, a second switch member biased to the open position and the closed position respectively with the opening bias predominating for controlling the motor starting connections, and means operated responsively to the closing of the first switch and under the control of the current taken by the motor for opposing the opening bias of the second switch member to permit the same to close during the starting of the motor and for automatically permitting the opening bias of the said second switch to open the same when the motor has accelerated to a predetermined speed.

12. The combination of an electric switch adapted to establish starting and running connections for a motor, of a switch member for controlling the running connections, a second switch member biased to the open and closed positions respectively with the opening bias predominating for controlling the starting connections and an electromagnet energized responsively to the speed of the motor upon the closing of the first switch for opposing the opening bias of the second switch member to permit same to close during the acceleration of the motor and for automatically permitting the opening bias of the said second switch to close the same when the motor has accelerated to a predetermined speed.

13. The combination in an electric switch adapted to establish starting and running connections for a motor, of a switch member for controlling the running connections, a second switch member for controlling the starting connections, an electromagnet energized responsively to the closing of the first switch for closing the second switch and for automatically opening the same when the motor has accelerated to a predetermined speed, and a thermal-responsive device heated in accordance with the current taken by the motor for automatically opening the first switch to protect the motor from conditions causing overheating.

14. The combination in an electric switch adapted to control an alternating current motor having a starting winding and a running winding, of a switch member biased to the open position and adapted when closed to energize the starting and the running windings, a flexible thermostatic latch for holding the said switch member in the closed position, the said latch adapted to be flexed responsively to the current taken by the motor to thereby release the switch member, a second switch member adapted when closed to energize the starting winding, and an electromagnet energized responsively to the current in the running winding for temporarily closing and then automatically opening the second switch member.

In witness whereof, I have hereunto set my hand this 28 day of April, 1921.

CHESTER I. HALL.